May 19, 1970
J. L. FARLEY ETAL
3,512,792
COLLET CHUCK FOR INERTIA WELDERS
Filed July 12, 1967
3 Sheets-Sheet 1
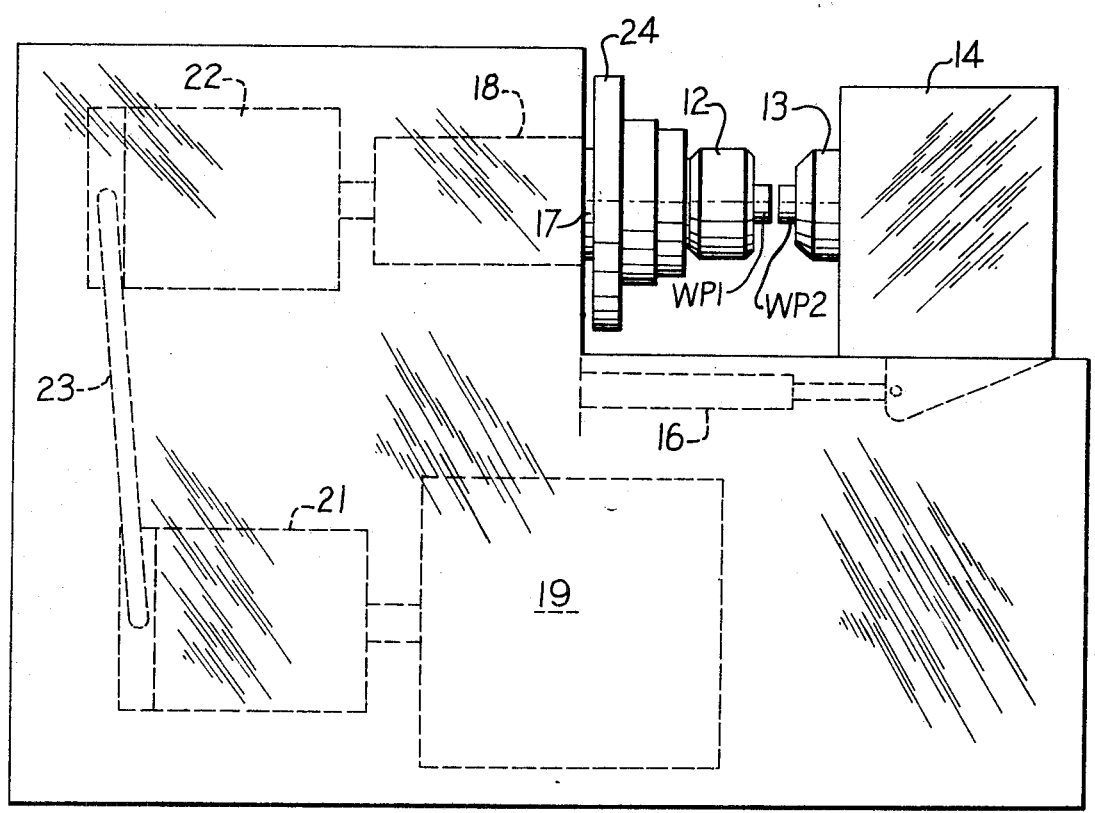
Fig_1_
INVENTORS
JAMES L. FARLEY
HARVEY L. GERECKE
EMIL S. NICKEL
BY
ATTORNEYS

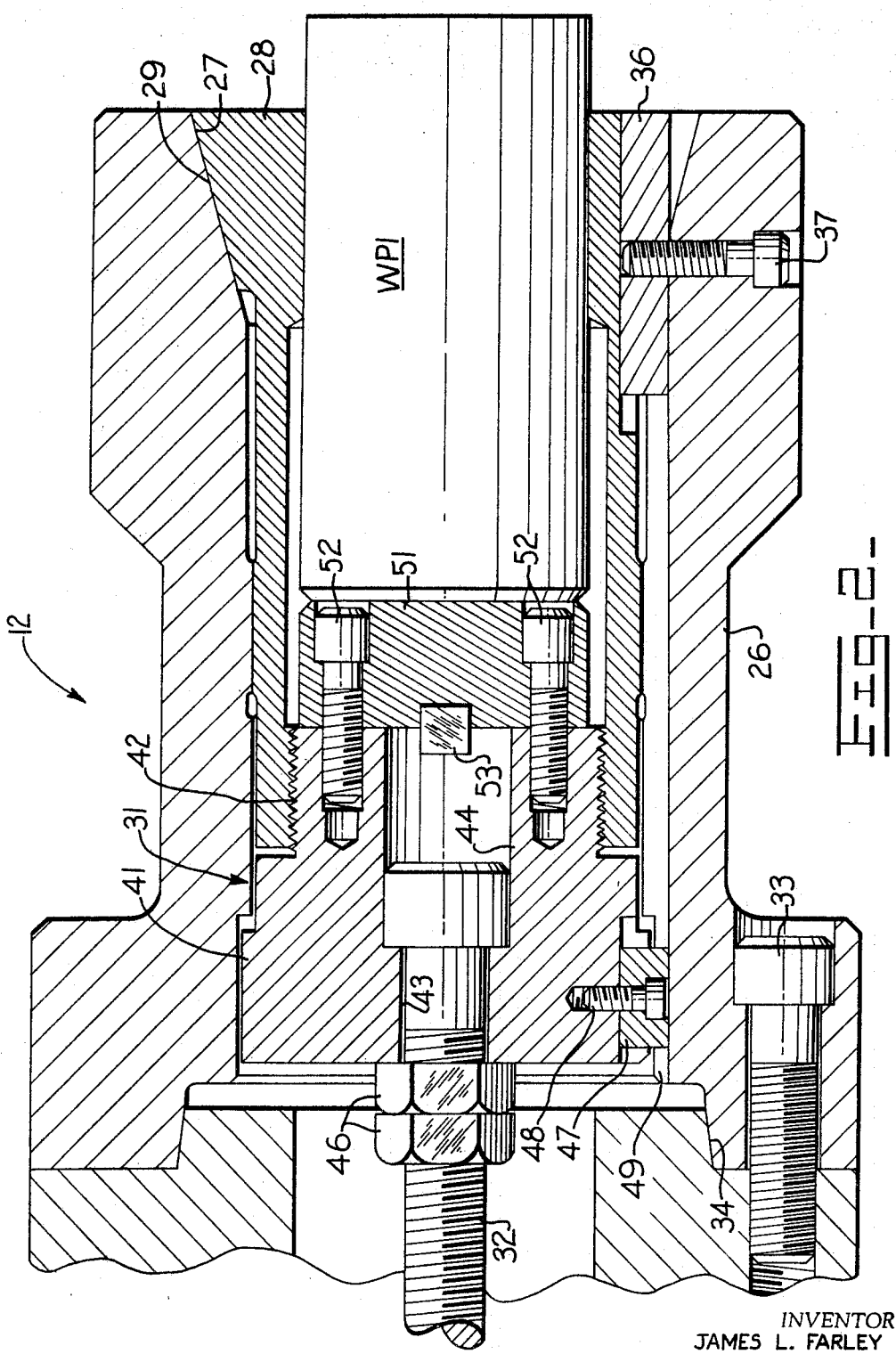

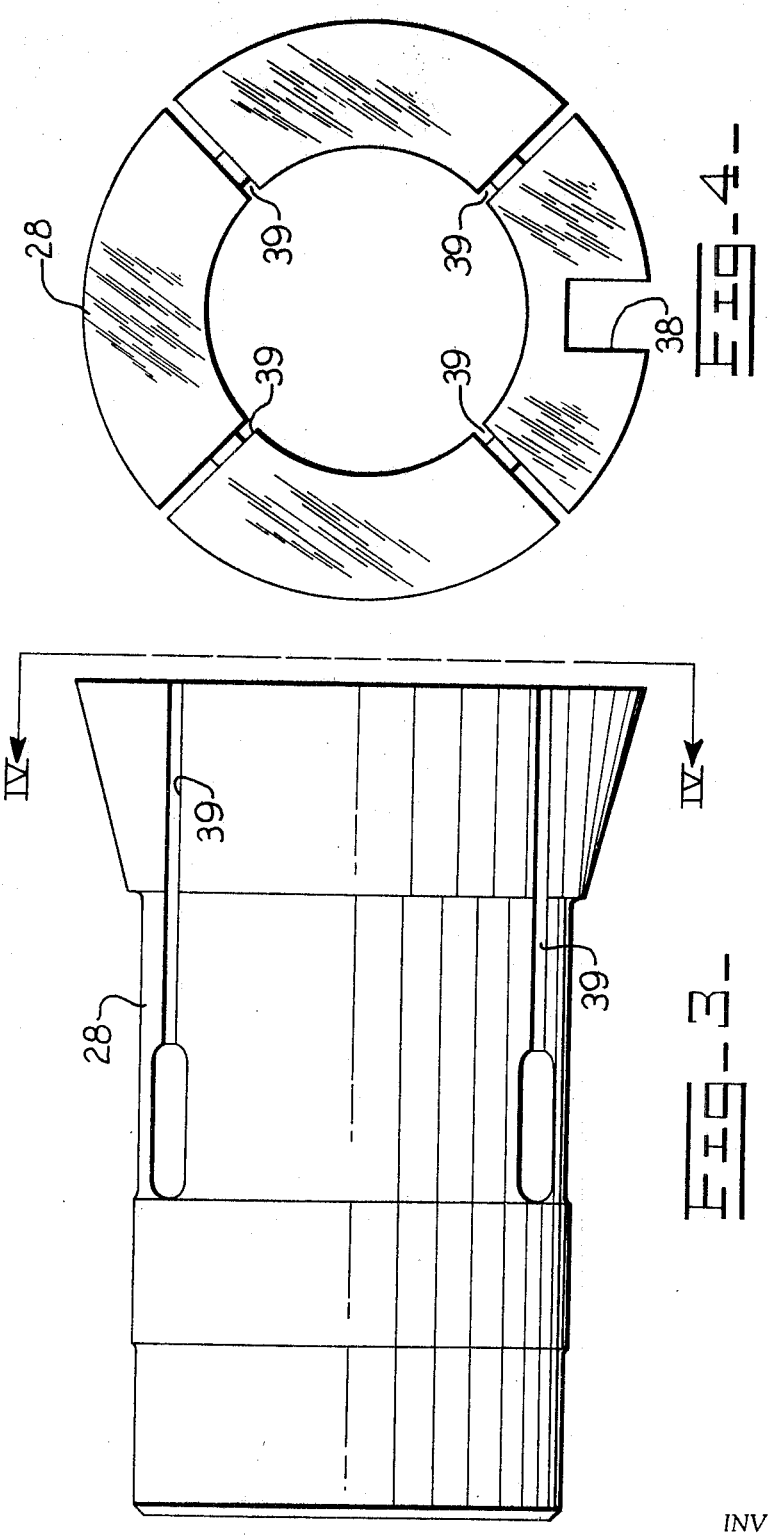

United States Patent Office 3,512,792
Patented May 19, 1970

3,512,792
COLLET CHUCK FOR INERTIA WELDERS
James L. Farley, East Peoria, Harvey L. Gerecke, Pekin, and Emil S. Nickel, Peoria, Ill., assignors to Caterpillar Tractor Co., Peoria, Ill., a corporation of Illinois
Filed July 12, 1967, Ser. No. 652,766
Int. Cl. B23b 31/20, 31/26
U.S. Cl. 279—51                                   2 Claims

ABSTRACT OF THE DISCLOSURE

A collet chuck for use in friction welding of a type having a tapered split collet sleeve disposed in a tapered chuck housing to receive a workpiece, wherein the collet sleeve is tightened upon the workpiece to prevent circumferential slippage therebetween as axial force is exerted upon the workpiece during the welding process. A backup member which is connected to the sleeve and engaged by an end of the workpiece is provided with freedom of motion so that axial force exerted by the workpiece thereupon urges the backup member and tapered sleeve into the chuck.

---

The present invention provides an improved chuck of the type having a sleeve like member for gripping a workpiece therein and, more particularly, a collet chuck for employment in inertia welding. One purpose of the sleeve is to grip the workpiece and prevent circumferential slippage therebetween during operation of the chuck. In many applications, high torque loads are developed which can make it difficult to keep the workpieces aligned. Friction welding, and more particularly, inertia welding is an example of an application where very high torque loads are developed and further, wherein the nature of the process requires a firm grip between the workpiece and the chuck in which it is held.

In applications of which inertia welding is an example, axial forces are exerted upon the chuck through the workpiece during the welding process. The present invention provides a chuck of the type referred to above wherein this axial force exerted through the workpiece upon the chuck is employed to tighten the sleeve-like member upon the workpiece while the axial forces are increasing to thereby eliminate circumferential slippage between the chuck and the workpiece and also to maintain the workpiece in radial alignment.

Other advantages and features of the present invention are made apparent from the following description with reference to the accompanying drawings wherein FIG. 1 is a side elevation view, in diagrammatic form, of an inertia welder machine, FIG. 2 is a side elevation view, with parts in section, of a collet type chuck assembly for use in an inertia welding machine; and FIGS. 3 and 4 are respectively a side view and an end view of a split collet sleeve employed within the collet type chuck assembly of FIG. 2.

A friction welding machine is illustrated in FIG. 1 as an exemplary setting for an improved chuck according to the present invention. The machine has a frame 11 with two parts to be welded, workpieces WP1 and WP2, mounted respectively within chucks 12 and 13. The tail chuck 13 does not rotate and is mounted upon a fixture 14. The fixture is mounted for axial movement on the machine frame under the control of a load cylinder 16. A pressure control circuit (not shown) regulates the pressure in the load cylinder, and thus determines the force with which the parts WP1 and WP2 are engaged. The chuck 12 is mounted on a spindle 17 and the chuck and spindle are mounted for rotation within the machine frame, with the spindle 17 disposed in a bearing assembly 18. An electric motor 19 rotates the spindle 12 through a hydrostatic transmission which includes a hydraulic pump 21, a hydraulic motor 22 and a manifold 23 between the pump and the motor. One or more inertia weights 24 are mounted on the spindle in accordance with inertia welding techniques.

The present invention is particularly concerned with the collet type chuck 12 and the construction thereof which provides a gripping force to hold the workpiece WP1 in place within the chuck. The collet type chuck generally comprises a chambered chuck housing 26 having a tapered annular surface 27 at the receiving end of its bore. A split collet sleeve is disposed within the chuck housing bore and has a tapered surface 29 generally mating with the tapered surface of the bore. A backup assembly 31, disposed within the chuck housing bore, is connected to the collet sleeve and is further disposed for positive engagement by the workpiece WP1 which is illustrated within the chuck and within the collet sleeve. The backup assembly 31 is connected to a draw bar means, which is illustrated in part by the threaded cap screw 32, the draw bar being operable to urge the backup assembly 31 and the collet sleeve into the housing bore to cause an initial gripping action of the sleeve upon the workpiece according to the interaction of the tapered surfaces 27 and 29. It is to be noted that the backup assembly 31 is engaged by the cap screw 32 in such a manner that the backup assembly is free to move deeper within the chuck housing bore even after being acted upon by the draw bar. In operation, the collet type chuck and workpiece WP1 are caused to attain a preselected rotational speed whereupon the tail stock fixture 14 (see FIG. 1) is moved leftwardly to cause joining engagement between the stationary workpiece WP2 and the rapidly rotating workpiece WP1. The engagement of the two workpieces results in a severe torsional force between the workpiece WP1 and the collet type chuck as well as an axial force exerted through the workpiece WP1 upon the backup assembly of the collet type chuck. According to the construction and operation of the present invention, this axial force exerted upon the backup assembly causes the backup assembly and the collet sleeve connected thereto to be urged further into the chuck housing bore. The sleeve thereupon tightens still further upon the workpiece WP1 and eliminates any circumferential slippage therebetween.

To describe the collet type chuck assembly in detail, having reference to FIG. 2, the chuck housing is secured upon the spindle by cap screws such as that indicated at 33 while a pilot nose 34 on the spindle provides for positive alignment of the chuck with the spindle. The sleeve is prevented from rotating independently of the chuck housing by means of a key 36 which is secured to the chuck housing by a cap screw 37 and which rides in a slot 38 in the sleeve (see FIG. 4). Although the tapers 27 and 29 on the sleeve and housing respectively are described above as matching, there is actually some slight mismatch to prevent the sleeve from sticking in the housing according to standard industry practice. For example, in the present embodiment, the angle of the tapered surface on the chuck is approximately 15° while the angle of the taper on the sleeve is approximately 15° and 15 minutes. Additionally, as is shown in FIGS. 3 and 4, the sleeve has longitudinal slots 39 disposed about the periphery thereof which permit it to partially collapse and exert increased tightening upon the workpiece as discussed in greater detail below.

Referring again to FIG. 2, the backup assembly comprises a backup nut 41 which is threaded at 42 for engagement with the inner end of the sleeve. The backup nut has a central bore 43 for receiving the shank of the cap screw 32 and a counter bore 44 in which the head of the cap screw is disposed. The left end of the cap screw joins to the power actuated draw bar (not shown) for application of a preset force upon the cap screw which is transmitted to the backup nut and then to the collet sleeve to cause initial gripping of the workpiece by the sleeve. A pair of mating jam nuts 46 are threaded onto the cap screw to assist in releasing the workpiece from the chuck as discussed below. Rotation of the backup nut independent of the chuck assembly is prevented by means of a key 47 which is secured to the backup nut by a cap screw 48 and which rides in a slot 49 formed in the chuck housing. A backup member 51 is secured to the receiving surface of the backup nut to provide for positive engagement of the weld piece against the backup assembly. Although the backup member could be a pilot or driver of almost any shape, primarily depending upon the shape of the weld piece, it is herein illustrated as a button of hardened steel which is fastened to the backup nut by means of cap screws 52 and keys 53.

During the welding process, the cylindrical workpiece WP1 is inserted into the sleeve of the chuck assembly. The power actuated draw bar referred to above acts upon the cap screw to urge the backup nut and collet sleeve into the chuck assembly. Because of the slots in the collet sleeve and the relation of the tapered surfaces, the sleeve collapses slightly and exerts an initial gripping force upon the outer diameter of the weld piece. The draw bar force is maintained while the spindle and chuck assembly, with the workpiece therein, are accelerated to a predetermined and preset velocity. When this velocity is attained, rotational power to the spindle is discontinued and the second workpiece WP2 is moved into joining relation with the workpiece WP1 by means of the tail stock fixture shown in FIG. 1.

The second stationary workpiece exerts an axial force upon the rapidly rotating workpiece WP1 which is transmitted to the backup assembly in positive engagement therewith. High torque forces are also developed in the workpiece relative to the chuck assembly which tends to cause circumferential slippage of the workpiece within the collet sleeve and misalignment of the workpieces.

To eliminate this undesirable circumferential slippage by the novel construction of the present chuck and to maintain the radial alignment of the parts being welded, the axial force exerted by the workpiece against the backup plate is transmitted to and urges both the backup nut and the collet sleeve still deeper into the chuck housing, thereby tightening and increasing the grip of the sleeve upon the workpiece while the axial force is increasing In this respect, it should be noted that as the axial force is exerted upon the workpiece and the backup nut, causing them to move deeper into the chuck housing, the draw bar means and cap screw 32 also move deeper into the chuck housing. Therefore, the draw bar force is always maintained on the workpiece WP1 during welding and the axial force is additive to the draw bar force.

After the completion of the weld, the axial welding pressure is released and the draw bar is actuated in a reverse direction causing the jam nut to act upon the backup nut and forcing the sleeve out of the chuck housing to release the weldpiece. The spindle is then retracted into the machine, the tail chuck or fixture is released, and the completed weld assembly can be removed from the machine.

Although the present collet chuck is described herein with particular reference to its use with a rotating spindle of an inertia welding machine, the chuck could also be used possibly in the tail stock of such a machine. Further, although the chuck is particularly adaptable for overcoming problems which are especially acute in the field of inertia welding, the chuck could also be employed in friction welding machines as well as in other applications where generally similar conditions and problems are present.

What is claimed is:
1. A collet chuck assembly, comprising:
 a chuck housing having a bore which is tapered at one end,
 a collet sleeve longitudinally movable within the housing bore, said sleeve having a tapered outer end generally mating with the taper in the bore, said sleeve being suitable for receiving a workpiece and interacting with the tapered bore to exert gripping force upon the workpiece,
 drawbar means associated with said collet sleeve for drawing said sleeve inwardly of the housing and causing it to tighten into gripping engagement upon the workpiece, and
 a backup member effectively secured to said sleeve adjacent its inner end for axial engagement by the workpiece, said sleeve and backup member being free for further movement inwardly of the housing after said sleeve is tightened upon the workpiece by the drawbar means, said backup member being responsive to axial thrust from the workpiece for moving further inwardly of the housing together with said sleeve and causing said sleeve to be further tightened upon the workpiece, said backup member comprising a backup nut secured to the drawbar means and threadedly engaging the inner end of the collet sleeve and a backup plate secured upon a receiving surface of said nut for positively engaging and transferring axial thrust from the workpiece to the backup nut and accordingly to the collet sleeve.

2. The collet chuck of claim 1 wherein the drawbar engages said backup nut by means of a cap screw having jam nuts for acting against the inner surface of said backup nut to release the workpiece.

References Cited
UNITED STATES PATENTS

| 2,771,297 | 11/1956 | Nipken | 279—52 X |
| 2,821,404 | 1/1958 | Sloan | 279—51 |
| 2,922,656 | 1/1960 | Belloli | 279—46 |

LESTER M. SWINGLE, Primary Examiner

D. D. EVENSON, Assistant Examiner

U.S. Cl. X.R.

279—53